United States Patent

Haberman et al.

[11] Patent Number: 6,063,737
[45] Date of Patent: May 16, 2000

[54] AQUEOUS DISPLACEMENT FLUID COMPOSITIONS FOR USE IN WELLBORES

[75] Inventors: Leonard Michael Haberman, Cypress; James Jang Woo Nahm, Houston, both of Tex.

[73] Assignee: Shell Oil Company, Houston, Tex.

[21] Appl. No.: 08/874,062

[22] Filed: Jun. 12, 1997

[51] Int. Cl.$^7$ .............................. C09K 3/00; E21B 33/13; E21B 21/00

[52] U.S. Cl. .......................... 507/261; 507/928; 166/304; 166/292; 166/312

[58] Field of Search ..................................... 507/136, 261, 507/928; 166/304, 292, 311, 312

[56] References Cited

U.S. PATENT DOCUMENTS

| | | | |
|---|---|---|---|
| 3,236,769 | 2/1966 | Burdyn et al. | 507/136 |
| 4,588,032 | 5/1986 | Weigand et al. | 166/291 |
| 4,717,488 | 1/1988 | Seheult et al. | 252/8.551 |
| 4,919,827 | 4/1990 | Harms | 507/261 |
| 5,008,026 | 4/1991 | Gardner et al. | 507/261 |
| 5,113,943 | 5/1992 | Wilson et al. | 166/291 |
| 5,330,662 | 7/1994 | Jahnke et al. | 252/8.551 |

*Primary Examiner*—Philip Tucker
*Attorney, Agent, or Firm*—Dennis V. Carmen

[57] ABSTRACT

An aqueous displacement fluid composition is used as a spacer fluid composition to change one type of drilling mud for another type of drilling mud or in cementing operations downhole, to clean downhole hardware in wellbores. The method comprises introducing into a wellbore an aqueous displacement fluid composition, such as a spacer fluid, to displace downhole wellbore fluids, having an improved rate of emulsification and a high capacity for emulsifying hydrocarbons, and aqueous fluid compositions. The aqueous displacement fluid composition introduced into wellbores contain mixtures of:

a) water;

b) a polyoxyalkylene monool surfactant represented by the formula:

wherein $R_1$ is a hydrocarbyl group, $R_2$ is a $C_1$–$C_3$ alkyl group, and the weight average of w+x is at least about 5; and c) a polyoxyalkylene monool surfactant represented by the formula:

wherein $R_1$ is a hydrocarbyl group, $R_2$ is a $C_1$–$C_3$ alkyl group, and the weight average of y+z is about 1 to about 4. Preferably, x and z are zero.

35 Claims, No Drawings

AQUEOUS DISPLACEMENT FLUID COMPOSITIONS FOR USE IN WELLBORES

FIELD OF THE INVENTION

The invention pertains to the field of aqueous displacement fluid compositions used in subterranean wellbores, and in particular, to a displacement fluid composition, such as a spacer fluid composition, having a high rate of emulsification and a high emulsion capacity, a water soluble non-ionic aliphatic polyoxyalkylene monool surfactant, and a water insoluble non-ionic aliphatic polyoxyalkylene monool surfactant.

BACKGROUND OF THE INVENTION

The drilling of boreholes is generally carried out using a rotary drilling process. The rotary drilling of a borehole is accomplished by rotating a drill string, having a drill pipe and a drill bit at its lower end, against the earth. Weight is applied to the drill bit while rotating to create a borehole into the earth. The drill string is hollow and sections are added to the drill string to increase its length as the borehole is deepened. This rotary drilling process creates significant amounts of friction which produces heat along with fragments of the strata being penetrated. The fragments of the strata must be removed from the borehole and the drill bit must be cooled to extend its useful life. Both of these necessities are accomplished by the circulation of a fluid composition down through the drill string and up to the surface between the drill string and the earthen wall of the borehole for the first few hundred feet. Native muds made of, for example, seawater and sediment are usually sufficient for cooling the drill bit and removing the cuttings while drilling a shallow surface hole.

Once the borehole has been drilled to the first few hundred feet, casings are usually inserted into the borehole extending from the surface downward in order to isolate the separate areas, zones or formations transversed by the borehole, and for protection against borehole collapse. The drill string is removed from the borehole, the casing is lowered into the borehole with each 30 ft segment typically being screwed onto the 30 ft segment below it. Once the desired length of casing has been inserted into the borehole, the drill string, made of a hollow pipe onto which is attached the drill bit, is lowered down the casing to continue drilling operations. Thus, a typical configuration would comprise, from outward in, the earthen borehole wall, the casing supporting the borehole wall, and the hollow drill string within the casing. Since the casing has a smaller diameter than the borehole wall, and the hollow drill string has a diameter smaller than the casing, there exists an annulus between the borehole wall and the casing, and between the casing and the drill string.

As the drill string within the casing rotates to bore the earth, a drill mud is pumped down the hollow drill string pipe, out the drill bit, and up through the annulus between the drill string and the casing to the surface, where it is treated and recirculated back down the drill string. The drilling mud has many functions. The drilling mud functions to carry chips and cuttings produced by drilling to the surface; to lubricate and cool the drill bit and drill string by carrying away heat; to form a filter cake which obstructs filtrate invasion in the formation; to maintain the walls of the borehole; to control formation pressures and prevent lost returns; to suspend cuttings during rig shutdowns; and to protect the formation for later successful completion and production. Further, since downhole temperatures can reach 200° C., the mud should retain its non-Newtonian characteristics within a wide range of downhole temperatures to successfully suspend the cuttings during temporary shutdowns, such as when more casing is lowered.

As the drilling depth increases, it becomes necessary to change the types of muds being pumped down the drill string. For example, for shallow drilling, water based muds usually possess sufficient properties to perform the necessary functions demanded of a mud. However, as the drill depth increases and one proceeds from one formation to another, so does the formation pressure and the heat generated by the drill bit. Since formation pressures increase at greater depths, it becomes necessary to use a higher weighted mud. Eventually, the mud has to be changed to a weighted oil based mud, also known as water in oil emulsions or invert drilling muds, to properly lubricate the drill bit, control formation pressure, and carry the cutting away from the drill bit and out the casing without breaking down. To prevent the new type of mud from contacting and becoming contaminated with the mud in use, a displacement fluid composition (a spacer fluid composition) is typically injected down the drill string behind the mud in use and in front of the new mud. The spacer fluid composition provides a physical barrier between different types of muds to avoid contact, and also serves to clean the hardware of the old mud.

Once the total drill depth is achieved, it becomes necessary to fill the annulus between the casing and the borehole wall with a cementitious material which will seal the annulus to inhibit communication between various formations penetrated by the wellbore and which will provide structural support for the casing or liner. This is commonly referred to as primary cementing. This is accomplished by removing the drill string, and pumping cement down the casing to the annulus opening between the casing and the earthen borehole, and up this annulus to the surface to cement the casing to earthen borehole. In order to perform the cement job, it is first necessary to displace the mud in the drill string and in the casing because conventional Portland cement and conventional drilling muds are incompatible. Also, contamination of the drill string and casing by the drilling fluid composition residue, especially oil based drilling fluid compositions, reduces the adhesion of the cement to the casing, leading to fluid and gas leaks. Further, as the cement is forced down the casing and up into the annulus, it is commingled with the drilling mud at any interface between the mud and the cement. The resulting mixture generally becomes a gel and does not set up into a strong cement. In addition, the gel strength and viscosity become uncontrollable and the mixture may either become too viscous to pump or may get thinner. In either event, the situation is unsatisfactory.

Therefore, a displacement fluid composition is used to displace the mud in the drill string and the casing prior to pumping cement down the casing. The displacement fluid composition acts as a physical barrier between the mud and the cement and cleans the hardware to avoid contaminating the cement with the mud. A displacement fluid composition is pumped down the casing through a hollow pipe inserted into the casing to remove and clean the mud from the inner lining of the casing and any hardware which may have contacted the mud. Then the cement is pumped down the casing and up the annulus between the casing and the borehole. The wellbore is then ready for completion operations, which usually consists of circulating other cleaning fluids through the casing, such as a gel spacer, a brine, and a solvent wash. Each of these fluids also operate to displace the fluid ahead of it already downhole. At this point, the casing is ready for a final completion operation, which normally consists of injecting and circulating a dense completion fluid composition down the casing to control formation pressures, optionally in a packer at the productive formation zone, and detonating an explosive device with, for example, steel bearings to perforated the casing and the wall of the borehole, thereby allowing the gas or crude hydrocarbons to penetrate through and up the casing.

The displacement fluid composition should exhibit several properties. The displacement fluid composition should be a good cleansing agent to remove oily layers and films from the hardware, thereby preventing contamination between one mud and another mud, and more importantly, prevent contamination of the cement with the oil based drilling mud. In particular, it is desirable that the rate of emulsification of the oil based mud be as fast as possible to reduce the amount of displacement fluid composition needed and/or reduce cycle time. It is also desirable that the displacement fluid composition have a high emulsification capacity so as to remove and stably suspend large quantities of oily cuttings, particulates. The displacement fluid composition should also be biodegradable to protect the environment surrounding the drilling operation, whether land or offshore based. Other desirable properties of displacement fluid composition are that they exhibit fluid composition-loss control, favorable rheology, and favorable density to control formation pressures.

Particularly unfavorable hydrocarbons used in drilling muds at one time were the diesel based fluids. These fluids were only poorly biodegradible. Other types of fluids used in drilling muds ranged from ester based fluids and polyalphaolefins, each of which were unsatisfactory either with respect to biodegradibility or in performance.

It had been a common practice to use an ethoxylated nonylphenol surfactant in spacer fluid compositions and even in drilling muds. For example, U.S. Pat. No. 4,717,488 describes a spacer fluid composition comprising a heteropolysaccharide S-130 (i.e., Biozan TM manufactured by Merck & Co., Inc.), an organophilic clay, a hydrocarbon solvent, a surfactant such as an ethoxylated nonylphenol surfactant or an ethoxylated linear alcohol, and an optional lower alkanol. U.S. Pat. No. 5,113,943 describes a spacer composition having a sulfonated styrene maleic anhydride copolymer, water, weighting agents, and an ethoxylated nonylphenol surfactant having a mole ratio of ethylene oxide to nonylphenol in the range of 1.5 to 15. U.S. Pat. No. 4,588,032 also describes spacer fluid composition compositions containing a mixture of nonylphenol ethoxylates having 1–6 moles of ethylene oxide and 7–14 moles of ethylene oxide, optionally in combination with sulfonated (anionic) linear alcohol ethoxylated with 2–20 moles of ethylene oxide, and further optionally in combination with a 3–8 carbon alcohol ethoxylated with 2–4 moles of ethylene oxide.

Ethoxylated nonylphenols are generally poorly biodegradable, and therefore their use in drilling fluid compositions, muds, or spacer fluid compositions is problematic to the environment, especially under the ocean floor where leakage is difficult to contain or clean up. Therefore, it would be desirable to formulate displacement fluid composition which do not rely upon the use of ethoxyalted nonylphenols as the surfactant. It would also be desirable to use a surfactant base which is non-ionic to avoid foaming tendencies commonly associated with the anionic sulfonate surfactants.

Nonionic aliphatic alcohols oxyalklyated with ethylene oxide have been described as one of the useful surfactants in spacer or drilling fluid compositions, such as the above mention U.S. Pat. No. 4,588,032 patent, as well as in U.S. Pat. No. 5,330,662. While such surfactants are usually readily biodegradable, their emulsification performance is less than desirable. In particular, not only should the surfactant be readily biodegradable, but its rate of emulsion and the emulsion capacity should be as high as possible, at least higher than that of a nonionic aliphatic alcohol ethoxylate or an ethoxylate of nonylphenol.

SUMMARY OF THE INVENTION

There is now provided a displacement fluid composition and a method for displacing drilling fluid compositions and cements from downhole hardware, wherein the displacement fluid composition has an excellent rate of emulsification, thereby efficiently cleaning downhole hardware; a high capacity for emulsifying hydrocarbons, thereby reducing the amount of displacement fluid composition needed to perform the job and reduce costs; is biodegradable; and controls formation pressures.

There are provided several methods. One of these methods is a method for displacing a downhole fluid in a wellbore comprising displacing the downhole fluid by circulating an aqueous spacer fluid composition into the wellbore containing the downhole fluid, the aqueous spacer fluid composition comprising a mixture of:

a) water;

b) a water soluble non-ionic aliphatic polyoxyalkylene monool surfactant; and c) a water insoluble non-ionic aliphatic polyoxyalkylene monool surfactant In one embodiment, the displacement fluid composition used in the method comprises a mixture of a) water;

b) a polyoxyalkylene monool surfactant represented by the formula:

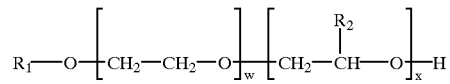

wherein $R_1$ is a hydrocarbyl group, $R_2$ is a $C_1$–$C_3$ alkyl group, and the weight average of w+x is at least about 5; and c) a polyoxyalkylene monool surfactant represented by the formula:

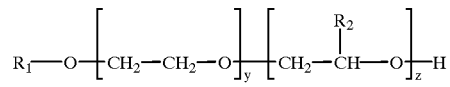

wherein $R_1$ is a hydrocarbyl group, $R_2$ is a $C_1$–$C_3$ alkyl group, and the weight average of y+z is about 1 to about 4. Preferably, x and z are zero, $R_1$ is a linear aliphatic hydrocarbyl group having 8 to 24 carbon atoms, and the amount of surfactant b) ranges from 60 wt. % to 85 wt. %, and the amount of surfactant c) ranges from 15 wt. % to 40 wt. %, based on the weight of the surfactants b) and c).

Other methods include the displacement of a drilling fluid composition, or an uncured cement, from wellbore downhole hardware, comprising displacing the drilling fluid composition or uncured cement from the wellbore downhole hardware with the spacer fluid composition described herein. Another embodiment comprises the following method:
a) making a wellbore by penetrating an earth formation with a drill string,
b) occupying the drill string with a first drilling mud,
c) displacing the first drilling mud with the spacer fluid composition, followed by
d) introducing a second drilling mud into the drill string.

There is also now provided an improved method for cementing casing in the wellbore, comprising the steps of:
a) introducing casing into a wellbore;
b) introducing a drill string within the casing to form a structure comprising, from out toward in:
   bi) the wellbore;
   bii) an annulus;
   biii) the casing;
   biv) an annulus;
   bv) a hollow drill string having a drill bit;
c) introducing or continuing a flow of a drilling mud through the hollow drill string and within the annulus between the casing and the drill string;
d) displacing and removing the drilling mud from the drill string and/or with said spacer fluid composition;
e) introducing a cement into the casing and within the annulus between the wellbore and the casing.

There is also provided methods for displacing a downhole fluid in a wellbore, comprising introducing a spacer fluid (synonymous in this embodiment to a push pill) into a wellbore, followed by introduction of a solvent, followed by introduction of a second spacer fluid, followed by introduction into the wellbore of a completion fluid. There is also provided a method of cleaning soiled downhole hardware in a wellbore comprising removal of hydrocarbon residue from soiled downhole hardware by introduction during a completion fluid operation a displacement composition into the wellbore.

DETAILED DESCRIPTION OF THE INVENTION

Throughout this description, the generic term displacement fluid is taken to mean what are conventionally known as a spacer fluid, a solvent wash, or fluids used in completion operations, termed a completion fluid, such as a gel spacer fluid, brine. For brevity, the term displacement fluid may be used and includes either a spacer oily solvent wash or completion fluid, the particular fluid depending upon the context. The spacer fluid acts upon drilling fluids, also known as drilling muds, and cementitious fluids by not only displacing a downhole fluids ahead of it, but also by providing a physical barrier between two types of downhole fluids (aqueous drilling fluid/oil based drilling fluid, one oil based drilling fluid/heavier weighted oil based drilling fluid, or cement/drilling fluid) to avoid cross contamination. The displacement fluid can also be considered one of the completion fluids since each of these will also function to displace the downhole fluid ahead of it. Completion fluids also operate to remove any residual hydrocarbon from soiled downhole hardware. The displacement fluid composition of and used in the invention is useful as or in each of these types of fluid compositions.

As used herein "down" or "in" as it relates to a drill string or casing means in a direction toward the farthest reach of the borehole even though in some instances the borehole can be disposed in a horizontal position. Similarly, "up" or "out" means back toward the beginning of the borehole.

The term "aqueous" as it relates to displacement fluid compositions is meant to encompass fresh water and salt water fluid compositions, whether as a brine or seawater, and any other kind of water or water soluble medium, in which the water or water soluble medium is the continuous phase. This would include a homogeneous fluid composition where all fluid compositions are solubilized; or a two phase fluid composition in which water and/or the water soluble medium is the continuous phase, and a glycol or a solid phase.

The term "hydrocarbyl" means one or more hydrocarbon groups and a substantially hydrocarbon groups. Substantially hydrocarbon describes groups which contain non-hydrocarbon substituents which do not alter the predominantly hydrocarbon nature of the group.

As used in the specification and claims a "barrel" is 42 gallons U.S.

The method of the invention comprises introducing into a wellbore a displacement fluid composition described below. By a wellbore is meant the hole drilled into earth, including any hardware temporarily or permanently within the wellbore, including casing and drill string. There is also provided a method of displacing a drilling fluid composition or an uncured cement from wellbore downhole hardware, comprising displacing the drilling fluid composition or uncured cement from the wellbore downhole hardware with the displacement fluid composition described below. For example, where one desires to replace an aqueous based drilling mud with an oil based drilling mud, or one oil based drilling mud with another oil based drilling mud, one may employ a procedure whereby a) a wellbore is made by penetrating an earth formation with a drill string, b) occupying by pumping the drill string with a first drilling mud, which can be aqueous or a lighter weighted oil based drilling mud relative to the second drilling mud to follow; c) displacing the first drilling mud with the displacement fluid composition described herein by pumping the displacement fluid composition down the hollow portion of the drill string, followed by d) introducing and pumping a second drilling mud into the drill string. The drill string can be fully operational while one mud is being replaced with the second mud, or one may pause the operation until the second mud has reached the bit or circulated through. The first mud and the spacer fluid composition are circulated through the bottom of the drill string and back through the annulus between the drill string and the wellbore, or if present, the casing. The displacement fluid composition in this case acts as a spacer to provide a physical barrier between the two muds, suspend and carry large amounts of cuttings and first mud residue from the hardware to the surface, and rapidly emulsify the residue from the hardware.

There is also now provided an improved cementing method using the displacement fluid composition of the invention. In this method, once a desired depth is drilled downhole by the drill string, drilling operations are usually suspended. Since the mud is circulated down the drill string and up and out the annulus between the wellbore and the drillstring, the surface of the wellbore is coated with mud. Most muds, especially oil based muds, are detrimental to providing strong adhesion between the casing, the cement, and the wellbore surface. Thus, it is desirable to remove as much mud from the wellbore surface prior to lowering, casing to ensure proper adhesion. Therefore, prior to removing the drill string for the casing operation, a displacement fluid composition of the invention may be circulated down the drill string and up and out of the annulus between the wellbore and the drill string to remove mud residue from the wall of the wellbore. Subsequently, the drill string is removed, and casing having a circumference slightly smaller than that of the wellbore is lowered downhole. At this point, a cementing operation as described below may be initiated, or further drilling may proceed forward as follows. The drill string is lowered down the casing to form a structure, from the walls of the wellbore inward, of:

i) the wellbore wall;

ii) an annulus;

iii) the casing;

iv) an annulus; and v) a hollow drill string having a drill bit.

The same or different mud is pumped down through the hollow drill string, out the drill bit, and up and within the annulus between the casing and the drill string, while drilling operations continue. Thus, the inner circumference of the casing now becomes coated with the drilling mud. This mud coating may be carried to the annulus between the wellbore wall and the casing by the cement lowered into the casing. Therefore, the drilling mud is displaced and removed from the drill string and the casing surfaces by pumping the displacement fluid composition of the invention and allowing it to circulate up and out through the annulus between the drill string and the casing, thereby both displacing and cleaning the drilling mud from the hardware surfaces. Once the hardware surfaces are free of drilling mud, the drill string is removed and a cement, such as Portland cement, is introduced into the casing and circulated up through the annulus between the wellbore wall and the casing, thereby bonding the casing to the wall of the wellbore.

Usually a well is drilled with more than one cement operation. Therefore, it becomes necessary to remove the residual cement left clinging to the inner surface of the casing. This can be accomplished by reintroducing the drill string and circulating the displacement fluid composition of the invention through the annulus between the casing and the drill string. If no further cementing operations or drilling is necessary, the cement should nevertheless be removed from the casing surfaces with the displacement fluid composition of the invention to provide a smooth clean surface for the unimpeded flow of gas and hydrocarbon up and out of the casing.

Upon completion of the drilling and cementing operations, there usually follows a completion operation designed to remove residual hydrocarbons left on the drill string and on the walls of the casing. These oily residues should be removed from the drill string to avoid contamination with other fluids in future use, and from the casing to provide clean smooth non contaminating surfaces for crude oil or natural gas flow from the production formation. While each particular type of completion fluid is differently formulated to perform a specific function, each may also contain the displacement fluid ingredients described herein to efficiently remove oily residue from the hardware.

The aqueous displacement fluid composition employed in the method of the invention comprises a mixture of a) water, a b) surfactant, and a c) surfactant each described in greater detail below. There are also provided aqueous displacement fluid compositions, further containing a large amount of water, or containing a d) ingredient comprising a weighting agent, a viscosifier, a brine, or a mixture thereof.

The displacement fluid composition used in the method of the invention is an aqueous displacement fluid composition. The aqueous continuous phase can comprise from 100 wt. % to immediately above the point at where an emulsion inverts from oil in water to a water in oil. This lower point will vary depending upon the particular ingredients and their amounts used in the displacement fluid composition.

The amount of water in the aqueous continuous phase will vary widely depending upon the application. Generally, however, the amount of water will range from 30 wt. % to 99 wt. %, based on the weight of the displacement fluid composition. For a weighted displacement fluid composition, the preferred amount of water ranges from 30 wt. % to 60 wt. %. For an unweighted displacement fluid composition, the preferred amount of water ranges from 60 wt. % to 99 wt. %, more preferably from 75 to 98 wt. % water.

Other water soluble fluid compositions can be used in the displacement fluid composition of the invention, and are considered as part of the continuous aqueous medium. Such compounds are discussed further below with respect to the additives which may be incorporated into the displacement fluid composition.

Surfactants

The surfactant combination used in the displacement fluid composition and in the the method of the invention is a combination of at least a b) water soluble non-ionic aliphatic polyoxyalkylene monool surfactant; and a c) water insoluble non-ionic aliphatic polyoxyalkylene monool surfactant. By "water soluble", is meant a surfactant which is sufficiently soluble in water at 25° C. that at least 80 grams will dissolve in 100 grams of water. By "water insoluble", is meant a surfactant which is substantially insoluble in water at 25° C. such that phase separation occurs between the surfactant and water at room temperature when left standing unagitated for one hour. The monool surfactant molecule contains only one hydroxyl group, preferably a primary hydroxyl group, most preferably attached as an end group to the oxyalkylene moiety.

The monools are non-ionic, meaning that the monool remains essentially non-ionic in solution. Some disassociation of the hydroxyl hydrogen from the surfactant may occur in solution due to the presence of other additives, but this will be only to a minor extent such that more than 50 mole % of the surfactant remains non-ionic in solution, preferably 80 mole % or more, more preferably 90 mole % or more, most preferably 95 mole % or more. In another embodiment, the surfactant is a non-ionic surfactant when added to the displacement fluid composition composition. Preferably, the surfactant is nonionic both when added to the displacement fluid composition and in solution, but at a minimum, greater than 50 mole % of the surfactant is non-ionic in solution. In a more preferred embodiment, the displacement fluid composition composition of the invention is essentially free of anionic surfactants. These surfactants have a tendency to foam and change the cloud point of the displacement fluid composition.

The surfactant is also aliphatic, meaning that it is not cyclic or aromatic. The aliphatic surfactant may be linear or branched, substituted or unsubstituted, paraffinic, olefinic, or acetylenic, preferably branched or linear and paraffinic, more preferably paraffinic and linear.

We have found that the combination of these two surfactant monool in the displacement fluid composition unexpectedly generated high rates of emulsification and high emulsification capacities. When compared against identical displacement fluid compositions each individually containing surfactant b) and surfactant c), the displacement fluid composition containing the combination of surfactants b) and c) exhibited order of magnitude increases in the rate of emulsification and the emulsification capacity. Solutions containing only surfactant c) were not even capable of testing since surfactant c) is not soluble in water. The displacement fluid composition of the invention also exhibited order of magnitude increases over a displacement fluid composition containing a 9 mole ethoxylate of nonylphenol. In an embodiment of the invention, the displacement fluid composition composition has a rate of emulsification which is at least 2.5 times, more preferably 4 times, most preferably 8 times that of an identical composition in which the surfactants b) and c) are replaced with a weight average 9 mole ethoxylate of nonylphenol. In another embodiment, the displacement fluid composition composition of the invention has an emulsification capacity at least 3 times, more preferably 4 times that of an identical composition in which the surfactants b) and c) are replaced with a weight average 9 mole ethoxylate of nonylphenol. The rate of emulsification is determined by injecting 10 $\mu l$ of dodecane in a glass beaker filled with 100 ml of a 1% solution of the surfactant package under consideration. The emulsification capacity is determined by adding the amount of 10 $\mu l$ doses of dodecane injected into a glass beaker filled with 100 ml of 1% surfactant solutions at intervals until the solution no longer clears. Specific details of the test are described in the examples below.

In another embodiment of the invention, surfactant b) comprises a polyoxyalkylene monool surfactant represented by the formula:

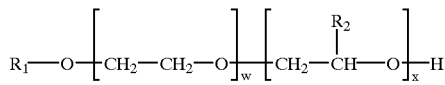

wherein $R_1$ is a hydrocarbyl group, $R_2$ is a $C_1$–$C_3$ alkyl group, preferably a $C_1$–$C_2$ group, and the weight average of w+x is at least about 5.

The c) surfactant in this embodiment is a polyoxyalkylene monool surfactant represented by the formula:

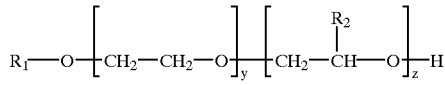

wherein $R_1$ is a hydrocarbyl group, $R_2$ is a $C_1$–$C_3$ alkyl group, preferably a $C_1$–$C_2$ group, and the weight average of y+z is about 1 to about 4.

The moieties represented within the w, x, y, and z groups may be in any order, random or block, either as an internal block of polyoxyethylene groups or as an external block of polyoxyethylene groups. Alternatively, the oxyalkylene units may be a homopolymeric unit rather than a copolymeric unit of different oxyalkylene units.

Preferably, the weight average of w+x is about 5 to less than 10, more typically from about 6 to about 8, and the weight average of y+z in the c) alcohol is about 2 to about 4. By the weight average, it is understood that the addition of an alkylene oxide onto an alcohol will produce a weight percent distribution of species having different numbers of alkylene oxide units added onto the alcohol, including the weight percent of species onto which no alkylene oxide were added, and that the weighted average of the number of alkylene oxide units in the surfactant composition is the number which corresponds to w, x, y, and z.

In a more preferred embodiment, the alkylene oxide units are homopolymeric, and more preferably, the alkylene oxide units are solely ethylene oxide. In this case, x and z are zero, and the b) and c) surfactants are polyoxyethylene monools. Where x and z are zero, w is preferably 6–8, most preferably a weight average of about 7, and y is preferably 2 to 4, most preferably a weight average of about 3.

The weight percentage of ethylene oxide groups relative to the total number of carbons represented in the $R_1$ group is often correlated to the HLB number of the surfactant molecule, described further below. In a preferred embodiment, the amount of ethylene oxide in surfactant c) ranges from about 35 to about 45 wt. % and the amount of ethylene oxide in the b) surfactant ranges from about 60 to 70 wt. %.

$R_1$ is a hydrocarbyl group. The hydrocarbyl group $R_1$ is an aliphatic hydrocarbyl group generally having 8 to 24 carbon atoms, with 9 to 18 carbon atoms being more typical. Preferably, the hydrocarbyl group is a linear alkyl (paraffinic) group, or at most, a linear alkyl group having only one branch, in order to enhance its hydrophobic/oleophilic properties. More general suitable examples of hydrocarbyl groups include: (a) alkyl, alkenyl, or alkynyl; (b) substituted hydrocarbons, that is, those substituents containing non-hydrocarbon groups which, in the context of this invention, do not alter the predominantly hydrocarbon nature of the substituent and which will remain substantially unreactive with alkylene oxides to avoid creating a polyol. Those skilled in the art will be aware of such groups, halo, especially chloro and fluoro, alkoxy, mercapto, alkylthio, nitro, nitroso, sulfoxy, etc.; and (c) hereto substituents, that is, substituents which will, while having a predominantly hydrocarbon character within the context of this invention, contain an atom other than carbon present in the hydrocarbon chain otherwise composed of carbon atoms. Suitable heteroatoms will be apparent to those of ordinary skill in the art and include, for example, sulfur, oxygen, nitrogen and such substituents as, e.g., pyridyl, furyl, thienyl, imidazolyl, etc. In general, no more than about 2, preferably no more than one, non-hydrocarbon substituent will be present for every ten carbon atoms in the hydrocarbyl group. Typically, there will be no such non-hydrocarbon substituents in the hydrocarbyl group. In one embodiment, the hydrocarbyl group is purely hydrocarbon. The aqueous displacement fluid composition of claim, wherein the hydrocarbyl group $R_1$ is an aliphatic hydrocarbyl group having 8 to 24 carbon atoms.

The amount of the b) and c) surfactants in the displacement fluid composition of the invention is an amount effective to provide the desired cleaning of the downhole hardware. Typically, the amount of b) and c) surfactants is from 0.1 wt. % to 20 wt. % based on the weight of the displacement fluid composition composition. Amounts ranging from 2% to 10% by weight, even from 2 to 7 wt. %, are effective in a rotating bob test described below. By volume, the amount of surfactants b) and c) is typically from 1.0 vol. % to 35 vol. %, more preferably from 2.0 vol. % to 20 vol. %, most preferably from 2.0 to 12 vol. %.

Relative to each other, the amount of surfactant b) ranges from 50 wt. % to 90 wt. %, and the amount of surfactant c) ranges from 10 wt. % to less than 50 wt. %, each based on the weight of the combined mixture of surfactants b) and c). The particular mix will depend upon other optional ingredients used in the displacement fluid composition of the invention, the downhole requirements, and the type of material deposited onto the hardware. In general, however, amounts of surfactant b) ranging from 60 wt. % to 85 wt. %, and surfactant c) ranging from 15 wt. % to 40 wt. % should be suitable for most applications, in particular amounts of surfactant b) ranging from 70 wt. % to 80 wt. %, and surfactant c) ranging from 20 wt. % to 30 wt. %. By vol. %, the amount of b) surfactant preferably is from 60 to 90 vol. %, and the amount of surfactant c) ranges from 10 to 40 vol. %.

In another embodiment of the invention, there is provided a method for displacement or cleaning using a displacement fluid composition containing a b) nonionic aliphatic polyoxyalkylene monool surfactant having an HLB of more than 10.5; and c) a nonionic aliphatic polyoxyalkylene monool surfactant having an HLB of 10.5 or less. The HLB number of a surfactant represents the hydrophilic/lipophilic balance of the molecule, which is often a good predictor of the molecule's emulsification efficiency for aqueous or oil media, wettability, and detergency. Lower HLB numbers correspond to more oil soluble surfactants, while the higher HLB numbers represent surfactants which are more water soluble.

It is preferred that the HLB of the nonionic c) surfactant ranges from greater than 6 to 10.5, more preferably from 7.5 to 9.5. It is also preferred that the HLB of the nonionic b) surfactant ranges from 11 to 16, more preferably from 12–14. Within these ranges, one may readily ascertain the optimum weight ratio of the surfactants relative to each other.

The surfactants b) and c) are readily biodegradable as defined in 40 CFR §796.3200, Jul. 1, 1991 edition, also known as the OECD 301D test method, incorporated herein by reference. By a readily biodegradable surfactant is meant that that the compound or composition gives a measured biochemical oxygen demand (BOD) of 60% or more within 28 days, and this level must be reached within 10 days of biodegradation exceeding 10 percent. This feature also represents an advantage over 9 mole ethoxylate nonyl phenols which only poorly biodegrade, often reaching only about a 30% biodegradation. In the event of leakage in water or soil, the biodegradability of the surfactant becomes an important environmental consideration in the selection of surfactant.

In a preferred embodiment, the displacement fluid composition of the invention is readily biodegradible. The oxyalkylates of aromatic and cycloaliphatic containing compounds are typically not readily biodegradible. Accordingly, in a more preferred embodiment, the displacement fluid composition of the invention is free of surfactants which do not readily biodegrade, and in particular, the displacement fluid composition of the invention is free of the oxyalkylates of aromatic and cycloaliphatic containing compounds. This would include freedom from the oxyalkylates of nonyl phenol. In these more preferred embodiments, the biodegradable efficacy of the displacement fluid composition surfactants described here will not be diminished by admixing other non-readily biodegradable surfactants.

The displacement fluid composition may be introduced and circulated into the wellbore by any driving means, such as surface pumps.

Weighting Agents

While weighting agents are commonly used in drilling fluid compositions, they may also be used as a densifier in the displacement fluid composition in amounts which may depend upon the formation pressure encountered downhole for the purpose of maintaining the wellbore stability and preventing a blowout. Without weighting agents, the density and resulting downhole pressure applied by the column of fluid composition may be insufficient to resist the pressures applied by gases or crudes escaping from the formation into the wellbore. When the displacement fluid composition is used as a spacer to displace a drilling fluid composition, clean the hardware, and precede a cementing operation, it is desired to add enough weighting agent to increase the density of the displacement fluid composition to at least that of the drilling fluid composition but less than the density of the cement. The use of weighting agents such as inorganic salts of various kinds also has the effect of promoting wellbore stability. When drilling through hard dry shale, typically high salt concentrations are desirable to prevent the swelling pressures in the wellbore from increasing due to hydration of the shale from the water in the displacement fluid composition.

Suitable examples of weighting agents include NaCl, NaBr, $NaCO_3$, KCl, $K_2CO_3$, $CaCl_2$, $CaBr_2$, $ZnCl_2$, $ZnBr_2$, and $NaNO_3$, $KC_2H_3O_2$, $NaCHO_2$, $CsCHO_2$, $KCHO_2$, barite (barium sulfate), galena (PbS), celestite (SrSO4), titanium oxides such as $TiO_2$ and ilmenite ($FeTiO_3$), and iron oxides such hematite ($Fe_2O_3$) and magnetite ($Fe_2O_4$), and siderite ($FeCO_3$), dolomite ($CaMg(CO_3)_2$), and calcite ($CaCO_3$). Particularly useful weighting agents include barium sulfate and iron oxide. The weighting agents may be present in an amount from about 20 to about 900 pounds per barrel (ppb).

Viscosifier

Suitable viscosifiers include biopolymers, attapulgite, sepiolite, silicates, and starch. Various products of wellum gum, e.g. polysaccharides, are suitable biopolymers. The water soluble polysaccharides can, in conjunction with other ingredients used in the invention, provide a displacement fluid composition which substantially retains its viscosity at high downhole temperatures, and remains a thixotrope, i.e, reverts back to its original viscosity as the sheer rate is reduced. The viscosifier also helps to carry cuttings to the surface and keep them suspended if the pumping action or sheer is shut down. An example of a suitable polysaccharide is a high molecular weight, slightly anionic biopolymer manufactured by Kelco Rotary of Tulsa, Okla., (Biozan™). A biopolymer, however, does not usually add enough viscosity for some applications. Accordingly, other viscosifiers mentioned herein may be mixed with the biopolymer or used alone.

Some other viscosifiers include bentonite, attapulgite, sepiolite, montmorillonite, hectoritc, saponite, illitc, Welan gum, hydroxyethylcellulose, carboxymethyl hydroxyethylcellulose, partially hydrolyzed polyacrylamide, acrylamide polymers, acrylic acid polymers, 2-acrylamido-2-methylpropane sulfonic acid copolymers, and polyvinyl pyrrolidinone, and acrylamide.

The viscosifier may be present in the displacement fluid composition in amounts ranging from about 5 to 80 percent by weight, based on the total weight of the displacement fluid composition.

Brine

The brine useful in the compositions and methods of the present invention may be naturally occurring field brine or one formulated by one or various salts. The brine contains at least 2 wt. % of sodium chloride, based on the weight of the displacement fluid composition. Other salts which may optionally be present include calcium chloride, magnesium chloride, sodium chloride, potassium chloride, zinc chloride, and zinc bromide. The calcium chloride is generally present in an amount from 1% to about 40% by weight of the brine. The magnesium chloride is generally present in an amount from about 0.5% to about 24% by weight of the brine. The sodium chloride is generally present in an amount from about 1% to about 27% by weight of the brine. The potassium chloride is present in an amount from about 0.5% to about 24% by weight of the brine. The zinc chloride or zinc bromide is generally present in an amount from about 0.5% to about 80% by weight of the brine. Each percent is by weight of the displacement fluid composition.

Other optional ingredients in the displacement fluid of the invention include, emulsifiers, fluid loss additives, lime, and other additives.

Lime

The displacement fluid composition of the invention, and the drilling fluid composition, may contain lime. These systems thus are analogous to conventional drilling fluid compositions known as high lime, low lime, and low lime/salt. By "low lime" is meant a drilling fluid composition having about 0.5 to 3, generally 0.5 to 2.0 lbs of unreacted lime per barrel of drilling fluid composition. By "high lime" is meant a drilling fluid composition having from greater than 3.0 to 15 lbs of unreacted lime per barrel of drilling fluid composition. The low lime/salt fluid compositions have about 1 to 4.0 lbs/bbl of unreacted lime and about 18 to 109 lbs/bbl of salt such as sodium chloride.

Other Emulsifiers

Any emulsifier suitable as a oil-in-water emulsifiers may be used in preparing the drilling fluid compositions. These emulsifiers preferably have HLB's (hydrophilelipophile balance) of about 8 to about 18. Such emulsifiers are well known in the art and lists as well as methods of preparing the emulsions are given in sources such as the Kirk Othmer's "Encyclopedia of Chemical Technology", 3rd Edition, Vol. 8, pages 900–930, Interscience Publishers, New York (1979). Often similar types of chemical emulsifiers are used to prepare water-in-oil and oil-in-water emulsions. However, within any given chemical type, it is important to select emulsifiers having the proper HLB for the preparation of oil-in-water emulsions.

The useful emulsifiers include reaction products of hydroxyamines or polyalkylene polyamines with a carboxylic acylating agent selected from the group of mono, di, tri and succinic acylating agents, fatty acid salts, amine or alkaline earth or transition metal sulfonates, polyoxyalkylene phenols, lecithin, polyoxyalkylene esters, polyoxyalkylene amine, polyoxyalkylene amides and polyoxyalkylene alcohols. In addition, lignosulfonates may be used as emulsifiers and thus serve both as dispersants and emulsifiers. Sulfonated styrene maleic anhydride copolymer (SS/MA) and its salts may also be included in the displacement fluid composition because it is a high charge density material that is capable of dispersing mixtures of drilling fluid composition and cement slurry.

Fluid Composition Loss Additives

Suitable fluid composition loss additives found in drilling fluid compositions include in addition to bentonite clay, carboxymethylated starches, starches, carboxymethyl cellulose, synthetic resins such as "POLYDRILL" by SKW Chemicals, sulfonated lignite, lignites, lignin, or tannin compounds.

Other Additives

Examples of other additives that can be used in the displacement fluid composition of the invention are defoamers such as long chain carboxylates of metals, like aluminum stearate. If desired, biological degradation of biopolymers can be stabilized with the inclusion of lower alkanols, as well as assist in dispersion of the ingredients in the displacement fluid composition. Alkali metal carbonates, such as sodium bicarbonate, can help to keep the drilling muds from contaminating the cement during the cementing operation by avoiding stringers of gelled mud fingering through the cement.

Oils

Natural and synthetic oils may be used in the displacement fluid composition of the invention to make an oil in water emulsion. Oils suitable for the invention include mineral oil, crude oil, diesel fuel oil, kerosene, gas oil, polyalphaolefin, olefin, paraffins, white oil, linear alkylbenzene, acetal, ether (di isodecyl ether), ester based vegetable oils, mixtures thereof, and the like. Vegetable oils include babassu oil, castor oil, coconut oil, corn oil, cottonseed oil, hemp oil, linseed oil, oiticica oil, olive oil, palm oil, peanut oil, rape oil, safflower, sesame oil, soybean, sunflower, and tung oil. Liquid oils include natural lubricating oils, such as animal oils, vegetable oils, mineral lubricating oils, solvent or acid treated mineral oils, oils derived from coal or shale, and synthetic oils. Synthetic oils include hydrocarbon oils and halo-substituted hydrocarbon oils such as polymerized and interpolymerized olefins, for example polybutylenes, polypropylenes, propylene-isobutylene copolymers, chlorinated polybutylenes, poly(1-hexenes), poly(1-octenes), poly(1-decenes); alkyl benzenes, such as dodecylbenzenes, tetradecylbenzenes, dinonylbenzenes, di-(2-ethylhexyl)benzenes; polyphenyls such as biphenyls, terphenyls, and alkylated polyphenyls; and alkylated diphenyl ethers and alkylated diphenyl sulfides and derivatives, analogs and homologs thereof.

Another suitable class of synthetic oils comprises the esters of fatty acids such as ethyl oleate, lauryl hexanoate, and decyl palmitate. The esters of dicarboxylic acids such as phthalic acid, succinic acid, maleic acid, azealic acid, sebacic acid, fumaric acid, adipic acid, linoleic acid dimer, malonic acid, alkyl malonic acids, alkenyl malonic acids with a variety of alcohols such as butyl alcohol, hexyl alcohol, dodecyl alcohol, 2-ethylhexyl alcohol, ethylene glycol, diethylene glycol monoethyl ether, propylene glycol. Specific examples of these esters include dibutyl adipate, di(2-ethylhexyl) sebacate, di-n-hexyl fumarate, dioctyl sebacate, diisoctyl azelate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethyl-hexanoic acid.

In general, an oil is not used in the displacement fluid composition when it is used to clean oily films from the downhole hardware. Where a cleaning operation is not critical and the retention of oily surfaces is not an obstacle or is desirable, then oils may be incorporated into the displacement fluid composition.

EXAMPLES

Example 1

The following procedure was used to test samples of different displacement fluid compositions for rate of emulsion and emulsion capacity. The test measures solution turbidity changes as a function of time and surfactant dose at a constant temperature.

A small amount of oil was injected into 1% solutions of surfactants. The pH was adjusted to within 6–8 if outside this parameter. A single injection yields the rate of solubilization, while more than one injection will yield the capacity that the surfactant has to emulsify the oil. The temperature of the solution was held at 25° C. The oil injected into the displacement fluid composition baths was dodecane. Each dosage was 10 μl of dodecane. The tip of the syringe was positioned at the base of the a stirrer and injected into the 1% solution bath.

A computer terminal attached to a plotter was loaded with a Labtech Notebook diskette. A spectrophotometer was set to % T. The water bath thermostat was turned on and set to 25° C. Into a glass beaker filled with 100 ml of deionized water were immersed a thermometer probe, a light probe, and a non-aerating stirrer. The cap was held above the water surface until the water covered the top of the metal lip, then dropped down into place to prevent air bubbles from becoming trapped under the metal cap. The spectrophotometer was adjusted to 90% T. Both the blue pen for plotting the temperature on a chart plotter and the red pen for plotting % T were calibrated. Chart paper speed was set to 24 cm/min, and then turned on to run a baseline of water, temperature, and % T for a few cm. The plotter was then turned off, the chart paper speed reset to 1 cm/min, and the beaker of water was removed from the jackstand, and the temperature probe, light probe, and stirrer were blow-dried with air or nitrogen. A sample beaker filled with 100 ml of a 1% solution of the surfactant in deionized water was then raised to immerse the stirrer and probe as per the same procedure described above. The stirrer speed was set to about 3500 rpm, a setting of 5.

A pure sample baseline is run for about 6 minutes, during which time G for go is depressed on the computer to generate the graph, after which the red pen is stopped on a heavy line in the chart paper. The chart paper speed was set to 24 cm/min. The tip of the syringe holding 10 μl of dodecane was positioned at the base of the stirrer away from the light source, and injected into the 1% solution at which time the chart paper was simultaneously turned on. The chart paper was run for 1 minute at 24 cm/min, after which the speed was reduced to 1 cm/min for 12 minutes or until the baseline is reached again. The single injection will determine the rate of emulsion (solubilization).

To ascertain the emulsion capacity, the injection is repeated when the baseline is reached. Each successive injection was run at 1 cm/min for at least 12 minutes or until the curve no longer dropped. When the curve no longer drops, there no longer exists any significant change in turbidity, which indicates that the capacity of the surfactant has been reached.

Both temperature and absorbance were plotted against time and printed from the computer terminal using Lotus 123 to graph the data. The baseline, slopes of the peaks, the correlation coefficient, and the inverse time of the peak were calculated. Based on the time and the slope of the decay curve produced by the oil blending uniformly with the surfactant solution, the rate of emulsion was calculated. The emulsion capacity was determined by the amount of oil that the solution could tolerate until turbidity remained constant. The results are reported in Table 1 below.

A description of the types of surfactants tested are set forth as follows:

A. Iconal® TDA-6 surfactant is derived from tridecyl alcohol oxyalkylated with an average of 6 moles of ethylene oxide, commercially available from BASF.
B. Iconal® TDA-8 surfactant is derived from tridecyl alcohol oxyalkylated with an average of 8 moles of ethylene oxide, commercially available from BASF.
C. Neodol® 1-7 surfactant is derived from an monool having an average of 11 carbon atoms ethoxylated with an average of 7 moles of ethylene oxide, commercially available from Shell Chemical Company.
D. Neodol® 1-9 surfactant is derived from a monool having an average of 11 carbon atoms ethoxylated with an average of 7 moles of ethylene oxide, commercially available from Shell Chemical Company.
E. Igepal® CO-630 surfactant is derived from nonyl-phenol oxyalkylated with an average of about 9 moles of ethylene oxide, commercially available from Rhone-Poulenc.
F. Surfonic® JL-80X surfactant is an alkyl polyoxyalkylene ether commercially available from Hart Chemical Ltd.
G. Triton® XL-80N surfactant is alkylaryl polyoxyethylene glycol commercially available from Union Carbide Corporation.
H. Neodol® 1-3 is derived from a monool having an average of about 11 carbon atoms oxyalkylated with an average of 3 moles of ethylene oxide.
I. is a 75/25 wt. % mixture of Neodol® 1-7 and 1-3 surfactants, commercially available from Shell Chemical Company as Neodol® 1-73B surfactant.
J. is a 75/25 wt. % mixture of Neodol® 1-9 and 1-3 surfactants, commercially available from Shell Chemical Company.

TABLE 1

| Sample (1% solution in 100 ml water) | Rate (T/min) | Capacity (μl dodecane) |
| --- | --- | --- |
| A. | 14.4 | 20 |
| B. | 21 | 20 |
| C. | 10 | 10 |
| D. | 1 | <5 |
| E. | 1.1 | 5 |
| F. | 8.2 | 10 |
| G. | 28.7 | 10 |
| H. | Not soluble | Not soluble |
| I. | 46 | 45 |
| J. | 22.5 | 30 |

The results above indicate that rate of emulsion and emulsion capacity of each of the monool 7 and 9 mole ethoxylate surfactants C and D were only about as good as the nonylphenol ethoxylates (E) commonly used as surfactants in the drilling industry. The rates and capacity of the monool 3 mole ethoxylate H could not be measured because it was not water soluble due to its hydrophobicity (HLB of about 8.7), thus would not ordinarily be considered as a useful surfactant in aqueous displacement fluid composition emulsions. flowever, when these two types of surfactants were combined as a mixture, the rate of emulsion and emulsion capacity increased by orders of magnitude. The increase in the rate of emulsion and emulsion capacity when the mixture of C and H were used was about 4 times in each case, while the increase when a mixture of D and H was at least greater than 10 and 5, respectively. The increase in the combined rate and capacity of emulsion was significantly greater than the nonylphenol ethoxylates or any other of the surfactants tested.

Example 2

In the next series of experiments, the rotational bob ("rb") method was used to qualitatively determine the cleaning power of the surfactants against various types of drilling muds and oils. This test provides a reasonable simulation of cleaning and water wetting obtained in a downhole setting. Often, turbulent conditions and high centrifugal forces exist downhole which usually aid the cleaning power. To emphasize the differences in the cleaning power of the different surfactants under the most difficult conditions, the RB test was employed without seeking to emphasize a turbulent flow.

A cylindrical bob was used having a 0.936 in. diameter cylindrical section that was 1.10 inches long, and conical top and bottom sections beyond the 1.10 inch long cylindrical section extending inward toward a shaft at the top section and a point at the bottom. The angle of the top conical section was at a 30° angle with a tangent perpendicular to the shaft and extending from the junction of the top conical section and the shaft, the shaft running ⅞ inch down the center of the bob as measured from the top of the top conical section. The angle of the bottom conical section measured 45° from a tangent perpendicular to the shaft and extending outward from the point of the bottom conical section. The shaft measured 0.272 inches in diameter and was 3 and ½ inches long to the top of the top conical section.

The bob can be made of polyethylene, carbon steel, stainless steel, glass, teflon, or Delrin plastic. The polyethylene bob was chosen and used because its white color would display the largest color contrast between the bob and oily residue left after cleaning.

The bob was mounted on a stirrer and spun at a constant speed of 400 rpm, which corresponds to a linear surface velocity of about 100 ft./min. The rotating bob is cleaned with acetone and a clean cloth. 100 ml of an oil base sample fluid composition described below with respect to Table 2 in a 100 ml plastic beaker was raised to the rotating bob to surround the bob with the fluid composition to a height slightly above the line where the top conical section begins to extend inward toward the shaft, thus coating at least the whole 1.10 in. length of the bob. The bob was left submerged for 1 minute. The beaker was then lowered, and excess oil was allowed to drain or fly off the bob.

A second 100 ml beaker containing the 100 ml sample of the surfactant solution to be tested was then raised to surround the bob and ¼ inch up the shaft from the point of the top of the top cylindrical section. The bob was rotated in the displacement fluid composition for 2 minutes, after which the displacement fluid composition beaker was lowered down away from the bob. The rotating bob was then immersed in a 250 ml beaker of water and rotated for 1 minute to rinse the cleaned surface, after which the water beaker was lowered and rotation was stopped.

At this point, the cleaning effectiveness of the surfactant sample was evaluated. The rating given was qualitative on a scale of 1–5, with a 1 representing 100% clean surface and a 5 representing zero clean surface. A 5 rating means that the bob was still completely coated with an oily film even though a substantial portion of the oily fluid composition may have been removed by surfactants or abrasive solids of the displacement fluid composition.

Subsequently, the water wettability of the surfactant was measured. A clear container containing water was slowly raised to immerse the cylindrical portion of a the bob after subjection to the above procedure, while observing the water meniscus at the bob surface. The meniscus was observed most easily by intermittently raising and lowering the water level slightly. The water wettability is reported as follows:

cww—completely (100%) water wet ww—water wet mww—mostly water wet pww—partially water wet sww—slightly water wet.

ow—oil wet or non water wet

The surfactant samples are identified as follows:

N represents a 75/25 wt. % mixture of Neodol® 1-7 and 1-3 surfactants respectively.

RinsAid™ surfactant represents a blend of ethoxylated nonyl phenol and linear alcohol sulfates, commercially available from Well-Flow Technologies.

MCS-A is a blend of surfactants commercially available from BJ Services.

MSC-3 is a spacer fluid composition comprised of clay, barite, ligno sulfonate thinner, and an organic suspending agent, commercially available from BJ Services.

CC-1200 is a blend of surfactant, commercially available from Rig-Chem.

HDS is a 14 ppg Dual Spacer Fluid composition comprised of clay, barite, and a suspending agent, commercially available from Halliburton.

Cleanbore A® is a surfactant comprising an alkyl polyglucoside commercially available from Halliburton Services.

Witcolate® SE-5 is an alcohol ethoxylate surfactant having a carbon number predominantly in the range of 12–15, with an average of 3 ethylene oxide units, subsequently sulfated and neutralized, commercially available from Witco Corporation.

OB-1 is an oil based spacer from BJ Services.

TABLE 2

| Surfactant/Spacer Fluid composition | 16.9 ppg McAllen Ranch (Diesel) Rating | Wet | 17.9 ppg State Lease (Diesel) Rating | Wet | 16.5 ppg Hot Rolled Versadrill (Escaid) (Mineral Oil) Rating | Wet | 15.3 ppg E. Matagorda Unit 2 (Exaid) (Mineral Oil) Rating | Wet | 17.6 ppg Conoco Versadrill (LVT) (Mineral Oil) Rating | Wet | 18 ppg NovaDrill (Polyalpha-olefin) Rating | Wet | 11.2 NovaPlus (Internal/Alpha Olefin) Rating | Wet | 13.9 ppg Auger SynTeq (Linear Internal Olefin) Rating | Wet | 17 ppg Petrofree LE (Linear Alpha Olefin) Rating | Wet | 10.5 ppg Ultradril (Linear Alpha Olefin) Rating | Wet |
|---|---|---|---|---|---|---|---|---|---|---|---|---|---|---|---|---|---|---|---|---|
| 4% N/Water | | | | | | | 1.0 | mww | 2.0 | mww | | | | | | | | | | |
| 5% N/Water | | | | | | | 1.0 | ww | 2.2 | ww | | | | | | | | | | |
| 6% N/Water | | | | | 1.0 | mww | 1.0 | mww | 2.0 | cww | | | | | | | | | | |
| 7% N/Water | | | | | | | 1.0 | ww | 1.8 | ww | | | | | | | | | | |
| 2% N + 4% MSC-A/Water | | | | | 1.0 | pww | | | | | | | | | | | | | | |
| 4% N + 4% MSC-A/Water | | | | | 1.0 | mww | | | | | | | | | | | | | | |
| 3% N/HDS | 1.1 | ww | 1.0 | pww | 1.1 | pww | 1.0 | mww | 2.5 | mww | 1.0 | mww | 1.0 | mww | 1.0 | pww | 1.0 | mww | 1.0 | mww |
| 4% N/HDS | — | — | 1.0 | ww | 1.1 | ww | — | — | 1.8 | mww | 1.8 | mww | — | — | 1.1 | pww | 1.0 | ww | — | — |
| 5% N/HDS | — | — | — | — | — | — | — | — | 1.6 | ww | — | — | — | — | 1.0 | pww | — | — | — | — |
| 6% N/HDS | — | — | — | — | — | — | — | — | — | — | — | — | 1.0 | ww | 1.0 | pww | — | — | — | — |
| 20% CC-1200/Water | 3 | — | 3.5 | — | | | | | | | 3.5 | — | 1.0 | ww | 1.5 | — | | | | |
| 20% RinsAid ®/Water | 5 | pww | 2.5 | pww | | | | | | | 5 | — | 3 | pww | 2.5 | — | | | | |
| 5% N/Water | 2 | ww | 1.3 | mww | | | | | | | — | — | 1.8 | mww | — | — | | | | |
| 10% N/Water | 1.6 | ww | 1.0 | mww | | | | | | | 1.8 | ww | 1.1 | ww | 1.3 | ww | | | | |
| 2% N/MSC-3 | 1 | pww | 1.0 | mww | | | | | | | 1.1 | pww | 1.0 | sww | 1.0 | pww | | | | |
| MSC-3 slurry | | | 3.5 | sww | | | | | | | | | 3.0 | ow | | | | | | |
| 5% MSC-AG/MSC-3 | 2.8 | — | 4.5 | — | | | | | | | | | | | | | | | | |
| OB-1 | 4 | pww | | | | | | | | | | | | | | | | | | |
| 5% BHI W-340/MSC-3 | 3 | pww | | | | | | | | | | | | | | | | | | |
| Cleanbore A ®/MSC-3* | | | | | | | | | | | | | | | | | 3 | pww | | |
| MSC-A/MSC-3* | | | | | | | | | | | | | | | | | 3.0 | pww | | |
| Witcolate ® SE-5/MSC-3* | | | | | | | | | | | | | | | | | 3.5 | pww | | |
| N/MSC-3* | | | | | | | | | | | | | | | | | 1.0 | ww | | |

*2.1 gal/bbl at 5% vol. concentration in the spacer base, the bob spun at 400 rpm.

The results of the evaluation indicate that the displacement fluid composition of the invention, represented by N, uniformly cleaned off the oily residue of a wide variety of oil based drilling muds from the bob. In media as simple as water, the surfactants of the invention produced cleaning ratings between 1 and 2 for almost all muds and at levels as low as 3 wt. %. The surfactants also successfully cleaned the bob when mixed with other commercially available spacer media, such as MSC-3 and HDS. Further, in almost all cases, the wettability of the surfactants was good as indicated by a pww, mww, or ww, or cww.

Example 3

Using the same procedure as in example 2, different types of surfactants were tested as 5% solutions in a 14 ppg MCS-3 spacer fluid. The oil used to coat the bob was 17 ppg Petrofree LE. The results of the testing are tabulated in Table 3 below.

TABLE 3

| Sample | Cleaning Effectiveness | Water Wettability |
| --- | --- | --- |
| MCS-A | 3 | pww |
| Neodol ® 25-3S* | 3.5 | pww |
| Cleanbore A ® | 3.0 | pww |
| N | 1.0 | ww |

*A sulfated ethoxylate of an alcohol composition having an average of 12–15 carbon atoms and an average of 3 ethylene oxide units per molecule.

The results indicate that the performance of the combination of Neodol® 1-7 and 1-3 surfactants was superior to the anionic version of the Neodol® 25–3S, as well as the alkyl polyglucoside and MCS-3 tested, in both cleaning effectiveness and water wettability.

What we claim is:

1. A method for displacing a downhole fluid in a wellbore comprising displacing said downhole fluid by circulating an aqueous spacer fluid composition into the wellbore containing the downhole fluid, said aqueous spacer fluid composition comprising a mixture of:
   a) water;
   b) a polyoxyalkylene monool surfactant represented by the formula:

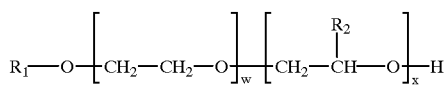

wherein $R_1$ is an aliphatic hydrocarbyl group having 8 to 24 carbon atoms, $R_2$ is a $C_1$–$C_3$ alkyl group, and the weight average of w+x is at least about 5; and
   c) a polyoxyalkylene monool surfactant represented by the formula:

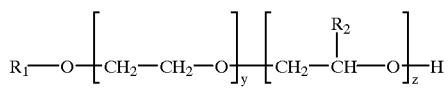

wherein $R_1$ is an aliphatic hydrocarbyl group having 8 to 24 carbon atoms, $R_2$ is a $C_1$–$C_3$ alkyl group, and the weight average of y+z is about 1 to about 4.

2. The method of claim 1, wherein the weight average of w+x is about 5 to about 15, and the weight average of y+z in the c) alcohol is about 2 to about 4.

3. The method of claim 2, wherein x and z are zero.

4. The method of claim 3, wherein the weight average of y is from 2–4, and the weight average of w is from about 6 to about 8.

5. The method of claim 4, wherein the hydrocarbyl group $R_1$ is an aliphatic hydrocarbyl group having from 9 to 18 carbon atoms.

6. The method of claim 4, wherein the hydrocarbyl group $R_1$ is a linear alkyl group.

7. The method of claim 1, wherein the amount of b) and c) surfactants is from 0.1 wt. % to 20 wt. % based on the weight of the composition.

8. The method of claim 1, wherein the amount of surfactant b) ranges from 50 wt. % to 90 wt. %, and the amount of surfactant c) ranges from 10 wt. % to 50 wt. %, each based on the weight of the combined mixture of surfactants b) and c).

9. The method of claim 8, wherein the amount of surfactant b) ranges from 60 wt. % to 85 wt. %, and the amount of surfactant c) ranges from 15 wt. % to 40 wt. %.

10. The method of claim 9, wherein the amount of surfactant b) ranges from 70 wt. % to 80 wt. %, and the amount of surfactant c) ranges from 20 wt. % to 30 wt. %.

11. The method of claim 1, wherein the composition has a rate of emulsification which is at least 25 times that of an identical composition in which the surfactants b) and c) are replaced with a weight average 9 mole ethoxylate of nonylphenol.

12. The method of claim 1, wherein the composition has an emulsification capacity at least 3 times that of an identical composition in which the surfactants b) and c) are replaced with a weight average 9 mole ethoxylate of nonylphenol.

13. The method of claim 1, wherein the spacer fluid composition is readily biodegradable.

14. The method of claim 1, wherein surfactant b) has an HLB of more than 10.5, and surfactant c) has an HLB of 10.5 or less.

15. The method of claim 1, wherein the aqueous spacer fluid composition further comprises a weighting agent.

16. The method of claim 1, wherein the aqueous spacer fluid composition further comprises a viscosifier.

17. The method of claim 1, wherein the aqueous spacer fluid composition is essentially free of the oxyalkylates of aromatic or cycloaliphatic containing compounds.

18. The method of claim 1, wherein said spacer fluid composition is essentially free of surfactants which do not readily biodegrade.

19. The method of claim 1, comprising displacing a drilling fluid composition or an uncured cement from within the wellbore by contacting said drilling fluid composition or uncured cement with said spacer fluid composition.

20. The method of claim 1, comprising:
   a) making a wellbore by penetrating an earth formation with a drill string,
   b) occupying the drill string with a first drilling mud,
   c) displacing the first drilling mud with the spacer fluid composition, followed by
   d) introducing a second drilling mud into the drill string.

21. The method of claim 20, wherein said first drilling mud is an oil in water emulsion, and said second based mud is a water in oil emulsion.

22. The method of claim 1, comprising the steps of:
   a) introducing casing into a wellbore;
   b) introducing a drill string within the casing to form a structure comprising, from the walls of the wellbore inward:

bi) the wellbore walls;
bii) an annulus;
biii) the casing;
biv) an annulus;
bv) a hollow drill string having a drill bit;

c) introducing or continuing a flow of a drilling mud through the hollow drill string and within the annulus between the casing and the drill string;

d) displacing the drilling mud from the drill string and/or within the annulus between the casing and the drill string with said spacer fluid composition;

e) introducing a cement into the casing and within the annulus between the the wellbore wall and the casing.

23. The method of claim 22, further comprising:

f) circulating said spacer fluid composition into the casing after the introduction of the cement in step e), to remove uncured cement from the casing.

24. The method of claim 1, comprising introducing casing into the wellbore, circulating a drilling mud through the wellbore, and subsequently introducing said spacer fluid composition to displace and clean residue of said drilling mud from the walls of the wellbore and the casing.

25. A method for displacing a wellbore fluid comprising introducing a spacer fluid into a wellbore and displacing said wellbore fluid with the spacer fluid, said spacer fluid comprising a mixture of:

a) water;

b) a water soluble nonionic aliphatic polyoxyalkylene monool surfactant; and c) a water insoluble nonionic aliphatic polyoxyalkylene monool surfactant.

26. A method comprising introducing into a wellbore an aqueous spacer fluid composition mixture comprising:

a) water;

b) a nonionic aliphatic polyoxyalkylene monool surfactant having an HLB of more than 10.5; and c) a nonionic aliphatic polyoxyalkylene monool surfactant having an HLB of 10.5 or less.

27. The method of claim 26, wherein the HLB of the c) surfactant ranges from greater than 6 to 10.5.

28. The method of claim 27, wherein the HLB of the c) surfactant ranges from 7 to 10, and the HLB of the b) surfactant ranges from 11 to 16.

29. A method for cementing casing in a wellbore, comprising:

(a) introducing casing into a wellbore;

(b) introducing a hollow drill string within the casing;

(c) introducing for continuing a flow of a drilling mud through the hollow drill string and within an annulus between the casing and the drill string;

(d) displacing and removing the drilling mud from the drill string with a composition comprising water, a water soluble non-ionic aliphatic polyoxyalkylene monool surfactant, and water insoluble non-ionic aliphatic polyoxyalkylene monool surfactant; and (e) introducing a cement into the casing and within an annulus between the wellbore and the casing.

30. The method of claim 29 wherein said water soluble non-ionic aliphatic polyoxyalkylene monool surfactant has an HLB of more than 10.5, and said water insoluble non-ionic aliphatic polyoxyalkylene monool surfactant has an HLB of 10.5 or less.

31. The method of claim 30, wherein said water soluble non-ionic aliphatic polyoxyalkylene monool surfactant has an HLB ranging from 11 to 16, and said water insoluble non-ionic aliphatic polyoxyalkylene monool surfactant has an HLB ranging from 7 to 10.

32. The method of claim 29, wherein said water soluble non-ionic aliphatic polyoxyalkylene monool surfactant is represented by the formula:

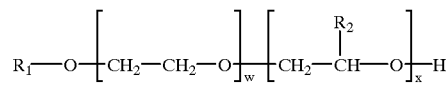

wherein $R_1$ is an aliphatic a hydrocarbyl group, having 8 to 24 carbon atoms, $R_2$ is a $C_1$–$C_3$ alkyl group, and the weight average of w+x is at least about 5; and said water insoluble non-ionic aliphatic polyoxyalkylene monool surfactant is represented by the formula:

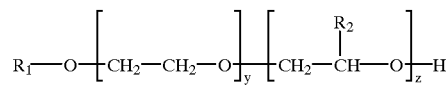

wherein $R_1$ is an aliphatic hydrocarbyl group having 8 to 24 carbon atoms, $R_2$ is a $C_1$–$C_3$ alkyl group, and the weight average of y+z is about 1 to about 4.

33. The method of claim 32, wherein x and z are zero, and the weight average of w is from about 6 to about 8, and weight average of y is from 2–4.

34. The method of claim 33, where $R_1$ is linear alkyl group.

35. A method of claim 34, wherein the amount of water soluble non-ionic aliphatic polyoxyalkylene monool surfactant ranges from 50 weight percent to 90 weight percent and the amount of water insoluble non-ionic aliphatic polyoxyalkylene monool surfactant ranges from 10 weight percent to 50 weight percent, each based on the combined mixture of said surfactants.

* * * * *